United States Patent
Kowalevicz et al.

(10) Patent No.: US 9,973,281 B2
(45) Date of Patent: May 15, 2018

(54) SYSTEMS AND METHODS FOR DEMODULATION OF FREE SPACE OPTICAL SIGNALS WITHOUT WAVEFRONT CORRECTION

(71) Applicant: RAYTHEON COMPANY, Waltham, MA (US)

(72) Inventors: Andrew Kowalevicz, Arlington, VA (US); Gary M. Graceffo, Burke, VA (US); Benjamin P. Dolgin, Alexandria, VA (US)

(73) Assignee: RAYTHEON COMPANY, Waltham, MA (US)

(*) Notice: Subject to any disclaimer, the term of this patent is extended or adjusted under 35 U.S.C. 154(b) by 0 days. days.

(21) Appl. No.: 15/717,175

(22) Filed: Sep. 27, 2017

(65) Prior Publication Data

US 2018/0091228 A1 Mar. 29, 2018

Related U.S. Application Data

(60) Provisional application No. 62/400,359, filed on Sep. 27, 2016.

(51) Int. Cl.
*H04B 10/00* (2013.01)
*H04B 10/67* (2013.01)
*G02B 17/00* (2006.01)
*G02B 5/28* (2006.01)
(Continued)

(52) U.S. Cl.
CPC ............ *H04B 10/671* (2013.01); *G02B 5/28* (2013.01); *G02B 17/004* (2013.01); *G02F 2/00* (2013.01)

(58) Field of Classification Search
CPC ... H04B 10/11; H04B 10/112; H04B 10/1121; H04B 10/1123; H04B 10/1125; H04B 10/1127; H04B 10/1129; H04B 10/114; H04B 10/1141; H04B 10/1143;
(Continued)

(56) References Cited

U.S. PATENT DOCUMENTS

2007/0031150 A1* 2/2007 Fisher ............... H04B 10/1125
398/128
2008/0226300 A1* 9/2008 Mayer ................. H04B 10/677
398/158

FOREIGN PATENT DOCUMENTS

JP H0591041 A 4/1993

OTHER PUBLICATIONS

Arimoto et al., "High-speed free-space laser communication", Performance and Management of Complex Communications Networks, 1998, pp. 175-190.
(Continued)

*Primary Examiner* — Daniel Dobson
(74) *Attorney, Agent, or Firm* — Lando & Anastasi, LLP

(57) ABSTRACT

Optical signal receivers and methods are provided that include an optical resonator that allows an optical signal to enter and optical signal energy to accumulate at regions inside the optical resonator. A portion of optical signal energy is emitted from among various regions of the optical resonator, such that a combination of the emitted optical signal energy is disturbed when a phase transition occurs in the received optical signal. A detector aligned with the output detects the combined emitted optical signal energy and is configured to detect the disturbance and determine a characteristic of the phase transition in the received optical signal based upon the disturbance.

20 Claims, 8 Drawing Sheets

(51) Int. Cl.
*G02F 2/00* (2006.01)
*H04J 14/00* (2006.01)

(58) Field of Classification Search
CPC .............. H04B 10/1149; H04B 10/116; H04B 10/676; H04B 10/677
See application file for complete search history.

(56) References Cited

OTHER PUBLICATIONS

Wright et al., "Adaptive optics correction into single mode fiber for a low Earth orbiting space to ground optical communication link using the OPALs downlink", Optics Express, vol. 23, Dec. 2015, pp. 1-8.
Andrews et al., "Final Report: Channel Characterization for Free-Space Optical Communications, Phase 0 testing at Hollister, CA, Phase 2 Final Testing at China Lake, CA", Jul. 2012, pp. 1-60. Retrieved from <URL: http://www.dtic.mil/cgi-bin/GetTRDoc?Location=U28,doc=GetTRDoc.pdf&AD=ADA565323> and accessed on Nov. 17, 2017.
Juarez et al., "High-sensitivity DPSK receiver for high-bandwidth free-space optical communication links", Optics Express, vol. 19, May 2011, pp. 1-8.
Zhang, L. et al. "Microring-based Modulation and Demodulation of DPSK Signal" Optical Society of America, Optics Express, vol. 15, No. 18, Sep. 3, 2007.
International Search Report and Written Opinion for application No. PCT/US2017/053667 dated Dec. 15, 2017.
Fang et al., "Multi-channel Silicon Photonic Receiver Based on Ring-resonators", Optics Express, vol. 18, No. 13, pp. 13510-13515, Jun. 21, 2010.
Xu et al., "Optical Differential-Phase-Shift-Keying Demodulation Using a Silicon Microring Resonator", IEEE Photonics Technology Letters, vol. 21, pp. 295-297, No. 5, Mar. 1, 2009.

\* cited by examiner

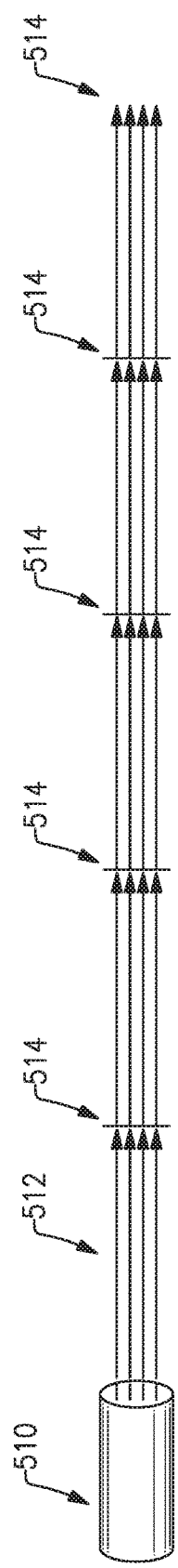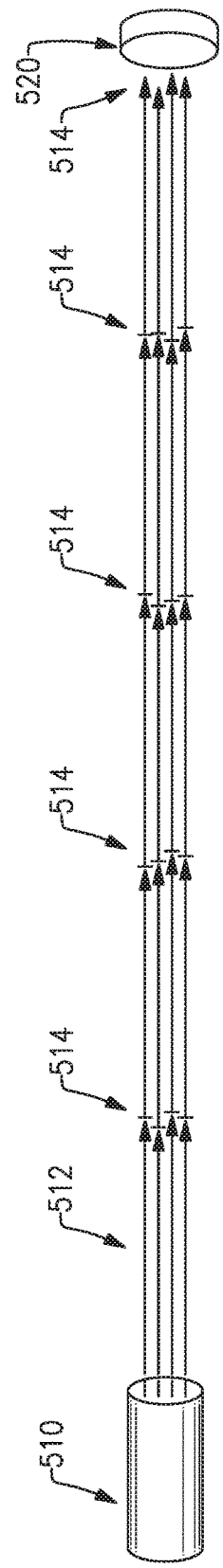

SYSTEMS AND METHODS FOR DEMODULATION OF FREE SPACE OPTICAL SIGNALS WITHOUT WAVEFRONT CORRECTION

CROSS-REFERENCE TO RELATED APPLICATIONS

This application claims the benefit under 35 U.S.C. § 119(e) and claims the benefit of priority under PCT Article 8, as applicable, of co-pending U.S. Provisional Patent Application No. 62/400,359 titled SYSTEMS AND METHODS FOR DEMODULATION OF FREE SPACE OPTICAL COMMUNICATION SIGNALS IN A TURBULENT ENVIRONMENT WITHOUT WAVEFRONT CORRECTION and filed on Sep. 27, 2016, which is herein incorporated by reference in its entirety for all purposes.

BACKGROUND

Light waves may be made to carry information by modulating a light source, often a laser source, to change various properties of the light, such as its amplitude, phase, frequency, wavelength, etc. The light waves may be in the visible spectral band, the infrared spectral band, or another region of the electromagnetic spectrum. In some cases, an underlying signal, such as a radio frequency signal, may be modulated via amplitude, phase, or frequency modulation, or any combination thereof, and the light source may be modulated by the underlying signal. Optical receivers receive the light waves and measure properties or variations of the light wave, such as the amplitude, phase transitions, and the like, from which the underlying signal and the information may be recovered.

Phase modulation of light signals may convey useful information. Information encoded in phase modulation may include transmitted communication data, or may include other information such as information about the source of the optical signal, interaction of the optical signal with an object, the optical channel through which the optical signal traveled, and/or objects with which it interacted. Compared to typical amplitude modulation receivers, phase modulation receivers can be significantly more complex, requiring precision optics, local oscillators, Fiber Bragg Gratings (FBG), and/or delay line interferometers (DLI), etc.

A receiver for modulated light waves should collect signal from a large enough area that the acquired signal power is high enough for accurate detection. Conventionally, a telescope may be aimed at the light source and the cross sectional area of the telescope, or aperture, may determine how much signal power is collected and concentrated (e.g., focused) at a receiver. When such light is phase modulated, optimal reception occurs if all the light rays (across the cross-section of the telescope) arrive at the detector in unison as a single wavefront, maintaining alignment of the original phase relationships of the light rays. Wavefront correction may be required in conventional light-focusing systems, e.g., if the light rays have propagated through varying media along the way, or were skewed, delayed, aberrated, or the like, as is typical for light waves traveling some distance through the atmosphere. Such systems may use adaptive optics to attempt to correct the light rays to their original phase relationships, but such are complex, fragile, and costly.

SUMMARY

Aspects and examples described herein provide systems and methods for demodulation of phase encoded information from free space optical signals, without the necessity for expensive critical focusing optics nor wavefront correction, nor a locally coherent clock source. In particular, certain examples of the system include a receiver having an optical resonator, such as a Fabry-Perot filter/resonator, for converting a phase-encoded optical signal across an aperture of free space into an intensity-encoded optical signal that may be generally focused and received by processing the amplitude variations, thereby reducing cost and complexity of the receiving system. Moreover, the optical resonator may function over a broad range of modulation rates without the need to modify the characteristics of the receiver. Additionally, one or more optical resonators may be employed to pass amplitude and other variations from the received signal, converting them into intensity-encoded output signals and thereby allowing higher order modulation schemes (e.g., phase, amplitude, frequency). Accordingly, the systems and methods disclosed herein may provide the flexibility to accommodate various encoding techniques and various modulation rates (e.g., baud rates) without requiring wavefront correction or coherent clock sources.

According to one aspect, an optical signal receiver is provided and includes at least one optical resonator defining a plurality of regions, an aperture to allow optical signal energy to enter, and an output to allow a portion of optical signal energy to be emitted, the at least one optical resonator configured to receive an optical signal via the aperture, to accumulate resonant optical signal energy at least within each region, to cause the emitted optical signal energy associated with each region to approach a steady-state output value, and to disturb the emitted optical signal energy associated with each region upon a transition in the received optical signal, the at least one optical resonator having at least one dimension to cause phase alignment of the accumulated optical signal energy at one or more resonant wavelengths, and a detector aligned with the output and configured to detect the disturbance to the emitted optical signal energy from one or more of the regions, and to determine a characteristic of the transition in the received optical signal based upon the disturbance.

According to some embodiments, the at least one optical resonator includes a plurality of optical resonators, each of the plurality of optical resonators defining at least one of the plurality of regions.

Some embodiments include a focusing optic aligned with the output and configured to focus the emitted optical signal energy associated with each region to provide a focused optical signal to the detector.

In certain embodiments, each region of the at least one optical resonator is configured to produce a temporary change in intensity of the emitted optical signal energy in response to a phase transition in the received optical signal, and the detector is further configured to detect a combined temporary change in the intensity of a combined emitted optical signal energy from all of the plurality of regions, and to determine the phase transition in the received optical signal based upon the combined temporary change. Additionally, in some embodiments, each region of the at least one optical resonator is configured to produce a variation in intensity of the emitted optical signal energy in response to amplitude variations in the received optical signal, and the detector is further configured to detect a combined variation in intensity from the combined emitted optical signal energy from all of the plurality of regions, and to determine the amplitude variation in the received optical signal based upon the combined variation in intensity.

According to some embodiments, the at least one optical resonator includes first and second reflective surfaces with reflective sides facing each other, the first reflective surface forming at least a portion of the aperture and being partially transmissive to optical signal energy arriving from outside the at least one optical resonator to allow optical signal energy into the at least one optical resonator, the second reflective surface forming at least a portion of the output and being substantially reflective but partially transmissive to optical signal energy inside the at least one optical resonator to allow the portion of the optical signal energy inside the at least one optical resonator to be emitted outside the at least one optical resonator.

Certain embodiments also include an optical-electrical converter configured to convert the emitted optical signal energy into an electrical signal, the electrical signal having an amplitude indicative of an intensity of the emitted optical signal energy, and the detector configured to detect the disturbance to the emitted optical signal energy by processing the electrical signal.

According to another aspect, a method of detecting information encoded in an optical signal is provided. The method includes receiving an optical signal at a plurality of regions of an aperture, accumulating optical signal energy from the optical signal in associated regions of at least one optical resonator, to approach a steady state of accumulated optical signal energy in the associated regions, outputting optical signal energy from the accumulated optical signal energy, the intensity of the output optical signal energy from each associated region proportional to the accumulated optical signal energy in each associated region, detecting combined output optical signal energy, the combined output optical signal energy being a combination of the output optical signal energy from a plurality of the associated regions, and determining a modulation characteristic of the received optical signal based on the detected combined output optical signal energy.

In some embodiments, determining a modulation characteristic of the received optical signal based on the detected combined output signal energy includes determining a phase variation in the received optical signal based on an intensity variation in the combined output optical signal energy.

Certain embodiments include reducing the accumulated optical signal energy in the associated regions of the optical resonator by destructive interference within the at least one optical resonator, in response to the modulation characteristic of the received optical signal. The modulation characteristic of the received optical signal may be a phase transition associated with a phase modulation, in some embodiments.

In some embodiments, accumulating the optical signal energy in associated regions of at least one optical resonator includes partially reflecting the optical signal energy between two semi-reflective surfaces.

Some embodiments also include converting the combined output optical signal energy into an electrical signal, the amplitude of the electrical signal being representative of the intensity of the combined output optical signal energy. Converting into an electrical signal may include focusing the output optical signal energy from a plurality of the associated regions.

According to another aspect, an optical receiver is provided that includes at least one etalon configured to at least partially accumulate optical signal energy at a plurality of regions between two semi-reflective surfaces and having an aperture to allow optical signal energy to enter and an output to allow a portion of the accumulated optical signal energy to be emitted from the plurality of regions, the at least one etalon configured to cause the output optical signal energy from each of the plurality of regions to temporarily vary in intensity based upon a phase transition in the entering optical signal energy at the respective region, an optical-electrical converter configured to receive the output optical signal energy from the plurality of regions and to convert the output optical signal energy into an electrical signal, and a receiver configured to receive the electrical signal and to determine information about the phase transition based in part on the electrical signal.

In certain embodiments, the at least one etalon includes a plurality of etalons, each of the plurality of etalons defining at least one of the plurality of regions.

Some embodiments also include an analog to digital converter configured to convert the electrical signal from an analog form to a digital form, the receiver configured to receive the digital form of the electrical signal.

In some embodiments, the receiver is further configured to correlate the electrical signal with at least one of a spreading code, a pseudo-random code, a block code, and a convolution code.

According to some embodiments, the at least one etalon is configured to have a nominal dimension selected to cause the etalon to at least partially accumulate optical signal energy of a particular wavelength.

According to some embodiments, the at least one etalon is configured to have a nominal dimension selected to cause the accumulation of optical signal energy to occur at a particular rate to accommodate an expected data rate associated with the data.

Still other aspects, examples, and advantages are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment. Various aspects and embodiments described herein may include means for performing any of the described methods or functions.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the disclosure. In the figures, each identical or nearly identical component that is illustrated in various figures is represented by a like numeral. For purposes of clarity, not every component may be labeled in every figure. In the figures:

FIGS. 5A-5B are schematic diagrams of examples of light ray propagation;

DETAILED DESCRIPTION

Figure 1:
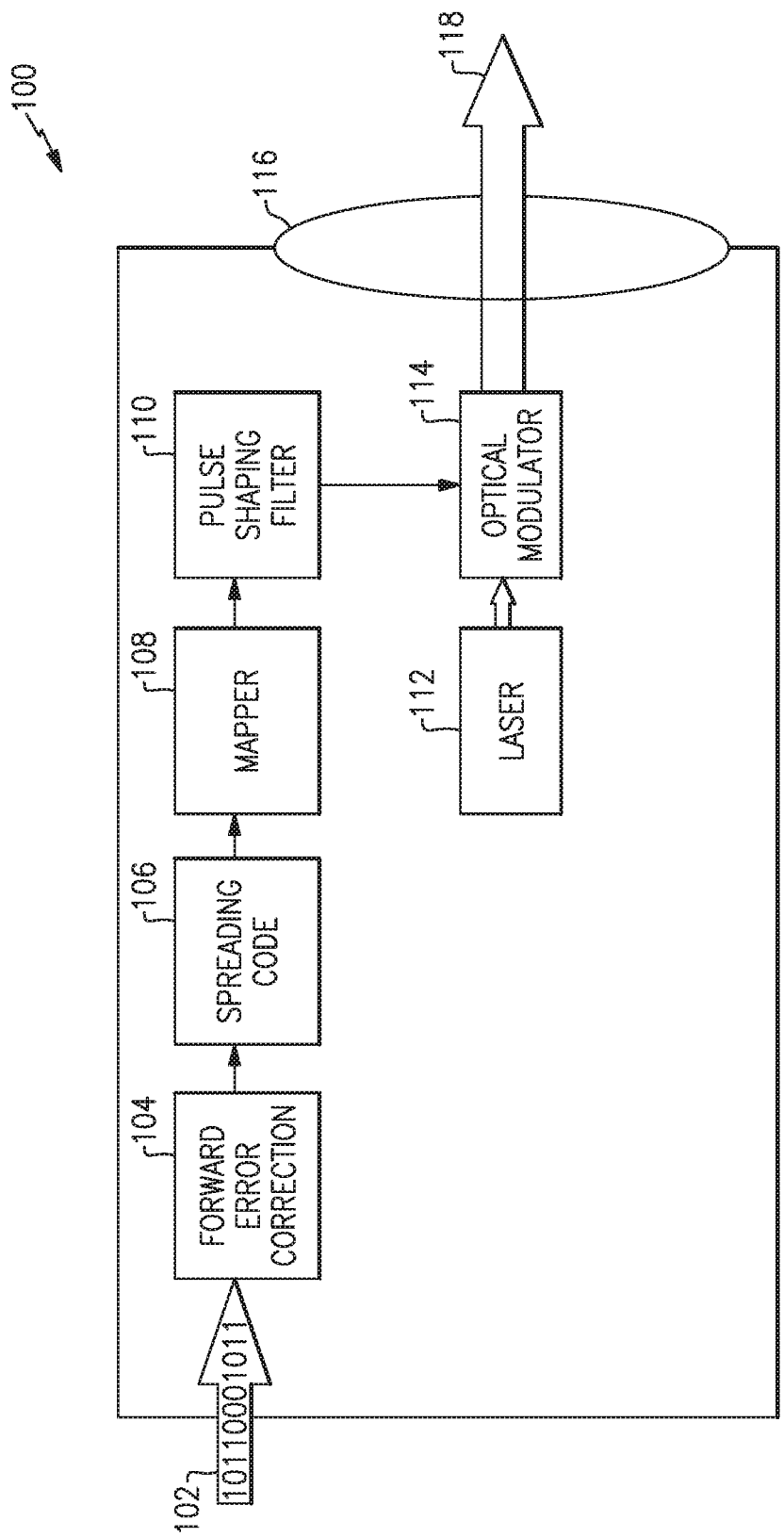
FIG. 1 is a block diagram of a notional optical transmitter for use with various examples described herein.

High bit rate approaches to free space optical communication often use a phase-shift keying modulation format, in part because it allows improvement in signal-to-noise ratio (SNR), typically on the order of 2-3 dB, as compared to direct detection of intensity modulations. Because information is encoded in the phase of the optical signal(s), wavefront aberrations (e.g., variations) on the order of a fraction of a wavelength can cause significant destructive interference (e.g., signal fading) when such optical signals are focused, e.g., for coupling into an optical fiber. Wavefront correction removes aberrations and allows non-destructive focusing of the optical signal into a single mode fiber, from which the signal may be demodulated by any number of coherent techniques. In these cases, adaptive optics (AO) are conventionally used to perform wavefront correction. For example, AO may utilize a deformable mirror surface with any number of wavefront sensors, such as a Shack-Hartmann sensor or a self-referencing interferometer. With feedback control, such systems are able to correct distortions of several microns at a rate of tens of thousands of corrections per second, but such systems are expensive, complex, and fragile.

Various aspects and embodiments are directed to improved systems and methods for demodulation of phase-encoded (i.e., phase modulated) optical signals that accommodate wavefront aberrations and therefore do not require conventional wavefront correction. In certain examples, the system includes an optical resonator, such as a Fabry-Perot filter/resonator, which converts a received phase-encoded optical signal into an intensity modulated output signal. Aspects and embodiments are directed to receivers that include such an optical resonator as a detector and converter element, that allows for and is operable in the presence of wavefront variation across an input aperture of one or more optical resonators.

As discussed above, it may be desirable to maintain (or recover) coherency of an optical signal, or to compensate for lack of coherency, particularly in applications where the optical signal may include phase modulation. Atmospheric perturbations tend to erode and ultimately destroy the spatial coherency of an optical signal. Conventional approaches of adaptive optics to compensate for wavefront variation, e.g., caused by air perturbations, have several disadvantages, including large size and weight. Further, precise alignment of all elements of an adaptive optics system and precise control of the adaptive optics is generally required for acceptable operation, but can be difficult to achieve because adaptive optics must act directly on the light rays with such high precision to physically correct variations on the order of fractions of a wavelength. Aspects and embodiments in accord with those discussed herein accommodate wavefront aberration, without direct correction, by providing an optical resonator having regions that act on an optical signal substantially independent of adjacent and/or other regions of the optical resonator, such that wavefront aberrations do not cause significant destructive interference from one region to the next. The optical resonator converts phase encoded information in the optical signal, at various regions of the resonator, into intensity-encoded information at an output optical signal. After phase changes have been converted to intensity variations by various regions of the etalon, the output optical signal may be focused.

Phase encoded optical signals may come from numerous sources and/or be generated by numerous processes. Detection of the phase encoding may therefore be useful for many purposes. A coherent optical signal, such as a laser beam, may be purposefully modulated by a data communications transmitter for instance, to encode communicated information on the optical signal. Other information, such as timing and/or time stamp information, may be purposefully encoded as a phase modulation. Numerous processes may phase modulate a coherent light source, and from which information about the process may be recovered by appropriate demodulation (e.g., interpreting) of the phase modulated optical signal. For example, various measurement systems may transmit an optical signal and analyze a reflected signal to determine dimensions, movement, defects, etc. Examples of various systems for which demodulation of phase modulated optical signals may be beneficial include target designators, laser guidance systems, laser sight, laser scanners, 3D scanners, homing beacons and/or surveying systems, as well as communication systems. In various of these examples, an optical signal may arrive via a free space signal path (e.g., free space optical, FSO) or a fiber or other waveguide system. Systems and method for demodulation of phase modulated optical signals in accord with aspects and examples disclosed herein may be beneficially applied to any of the above example optical systems, or others, to receive, detect, recover, etc. useful information from an optical signal having phase encoding.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

For the purposes of this disclosure, and as will be understood by those of skill in the art, the terms light, light signal, and optical signal may be used interchangeably herein and refer generally to an electromagnetic signal that propagates through a given medium, which may be empty space, e.g., a vacuum, or may be an atmospheric, e.g., air, or other medium, such as fiber or other optics components. The terms light, light signal, and optical signal are not meant to imply any particular characteristic of the light, such as frequency or wavelength, band, coherency, spectral density, quality factor, etc., and may include radio waves, microwaves, infrared, visible, and/or ultraviolet electromagnetic radiation, or other electromagnetic radiation conventionally processed in the field of optics.

Many optical receivers (e.g., coherent receivers) require a stable clock in order to accurately perform demodulation processes for a received signal, and may also require sophisticated optics such as 90-degree hybrids, phase shifters, and the like, especially when modulation includes encoding of information in polarization of the optical signal. In contrast, optical receivers in accord with the aspects and examples disclosed herein do not require a local coherent clock source nor significant optical components to achieve the same receiver capabilities as a conventional optical receiver. The benefits are achieved, at least in part, by an optical front-end that includes an optical resonator capable of detecting modulation transitions, such as phase variations, without a coherent reference source. The optical resonator further transforms the modulation, e.g., phase modulation, into an intensity modulation that allows simplified processing, potentially in the electrical domain.

Figure 2:
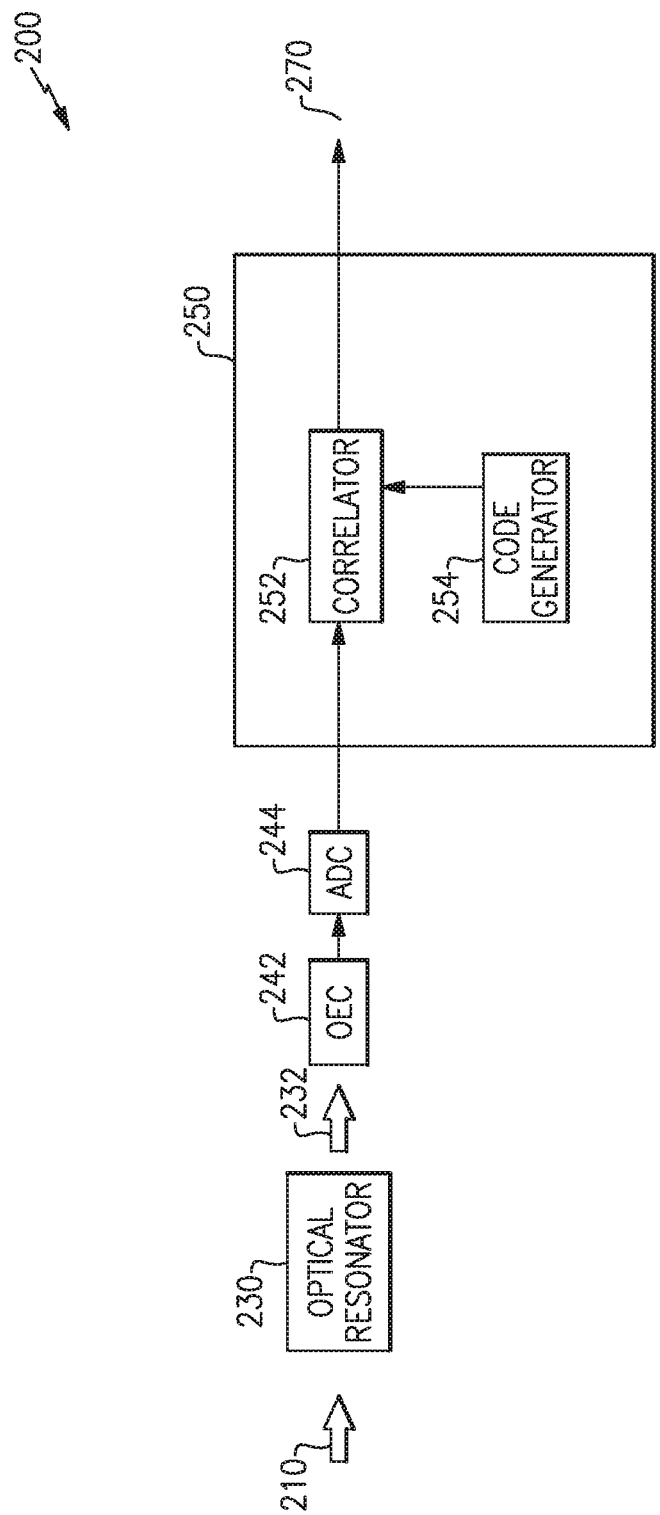
FIG. 2 is a block diagram of an optical receiver according to various examples described herein.

A functional block diagram of one example of a transmitter (e.g., optical transmitter 100) is illustrated in FIG. 1, and a functional block diagram of one example of a receiver (e.g., optical receiver 200) is illustrated in FIG. 2. The transmitter illustrated in FIG. 1 may be combined with the receiver illustrated in FIG. 2 to provide one example of a communication assembly, as will be readily apparent to one of ordinary skill in the art given the benefit of this disclosure.

Though the components of the example optical transmitter 100 shown in FIG. 1 and the optical receiver 200 shown in FIG. 2 may be shown and described as discrete elements in a block diagram, and may be referred to as "module", "circuitry", or "circuit," unless otherwise indicated, the components may be implemented as one of, or a combination of, analog circuitry, digital circuitry, or one or more microprocessors executing software instructions (e.g., predefined routines). In particular, the software instructions may include digital signal processing (DSP) instructions. Unless otherwise indicated, signal lines between components of the optical transmitter 100 and components of the optical receiver 200 may be implemented as discrete analog, digital, or optical signal lines. Some of the processing operations may be expressed in terms of calculations or determinations by the optical transmitter 100, the optical receiver 200, a controller, or other components. The equivalent of calculating and determining values, or other elements, can be performed by any suitable analog or digital signal processing techniques and are included within the scope of this disclosure. Unless otherwise indicated, control signals may be encoded in either digital or analog form.

Referring to FIG. 1, one example of an optical transmitter 100 may include an input 102 to receive a data payload, a forward error correction (FEC) module 104, a spreading module 106, a mapping module 108, a pulse-shaping filter 110, an optical source (e.g., a laser) 112, a modulator 114, and optics 116, and an output 118 to provide an optical signal output.

In the transmitter 100, the FEC module 104 implements forward error correction by adding redundancy to the data with a block code or convolution code. For example, the FEC module 104 may repeat one or more bits within the data payload to reduce an effect that the transmission medium may have on the transmitted signal waveform. Accordingly, in various examples the optical transmitter 100 may include a FEC module 104 to control errors that may result from transmitting the data payload through a noisy or lossy medium.

The transmitter 100 includes a spreading module 106 that applies to the data payload a spreading code useful for identifying and processing signal components in the receiver, and reduces the effects of inter-symbol interference (ISI). For example, the spreading module 106 may include a pseudo-random code generator (PRCG) and may apply direct sequence spread spectrum (DSSS) techniques known in the art, while other examples of transmitters or spreading modules may apply other forms of spreading.

The mapping module 108 maps the data payload to a particular modulation scheme, such as various positions of a particular phase and amplitude constellation, depending upon the types of modulation used by the transmitter, e.g., phase, amplitude, frequency, or any combination of these.

A pulse-shaping filter 110 may receive output of the mapping module 108 and control the modulator 114 to impose the modulation scheme on the optical source 112 to generate a modulated optical signal. In various examples, the modulator 114 may be an electro-optic modulator, and may include the optical source 112, such as a laser. In particular, the optical source 112 may emit a continuous carrier waveform that is modulated (e.g., in phase, amplitude, and/or frequency) for each symbol of the data payload to encode those symbols on the carrier waveform. The transmitter 100 may also include various optics 116 such as one or more mirrors or lenses to direct the optical signal at the output 118.

Referring to FIG. 2, illustrated is an example of an optical receiver 200 according to various examples discussed herein. FIG. 2 is described with continuing reference to the optical transmitter 100 of FIG. 1, which may communicate data payloads to the optical receiver 200. Additionally, a receiver and a transmitter may be paired together, e.g., to form a transceiver, capable of bidirectional data communication with another transmitter/receiver pair.

The illustrated receiver 200 receives an optical signal 210 and includes an optical resonator 230 and a digital processing subsystem 250 that provides an output 270. The optical resonator 230 may be coupled to the digital processing subsystem 250 by an optical-electrical converter 242 and an analog to digital converter 244, for example.

Examples of optical resonators 230 may include Fabry-Perot etalons, micro-rings, or other types of resonators. The optical resonator 230 is a component capable of sensing transitions, such as phase variations, representative of modulation performed at the transmitter, and transforming the transitions into intensity modulation of an output optical signal, e.g., output optical signal 232. The optical resonator 230 converts the modulation of the arriving optical signal 210 in part by interaction of the arriving optical signal 210 with resonant optical energy built-up in the optical resonator 230.

For example, an etalon is a component having semi-reflective surfaces that may include a transparent material in between, and has one or more characteristic resonant frequencies, each associated with a certain wavelength of light, based upon the spacing (i.e., dimensional length) between the semi-reflective surfaces. The surfaces are semi-reflective and also semi-transmissive, in that they allow some light through, and therefore the arriving optical signal 210 may be allowed into the etalon and may resonate inside the etalon (i.e., between the two semi-reflective surfaces). Additionally, some of the light resonating inside is allowed out of the etalon (through the semi-transmissive surface). Light emerging from the etalon is shown, for example, as the optical signal 232 in FIG. 2.

An optical signal received by an optical resonator 230, an etalon in this example, may establish a steady-state energy-conserving condition in which optical signal energy continuously arrives at the etalon, accumulates or adds to built-up resonating energy existing inside the etalon, and emerges from the etalon at a constant rate. A change in the arriving phase, frequency, or amplitude of the optical signal may disrupt the resonance inside the etalon, and the light intensity emerging from the etalon is also disrupted, until a steady state condition is re-established. Accordingly, a change in phase, frequency, or amplitude of the arriving optical signal 210 causes a change in intensity of the emerging optical signal 232. A large phase transition in the arriving optical signal 210, for example, causes a large (but temporary) intensity change in the emerging optical signal 232. Similar operation occurs in a micro-ring or other optical resonator, and accordingly an optical resonator 230 functions as a demodulator, or a modulation converter, for an optical signal 210. The emerging optical signal 232 may therefore carry the same information content as the arriving optical signal 210, but in intensity modulated form.

The emerging intensity-modulated optical signal 232 may be converted to an electrical signal by an optical-electrical converter, e.g., OEC 242, which may include a photodetector, such as a photodiode, for example. Accordingly, the output of the OEC 242 may be an amplitude modulated signal representative of the intensity-modulated optical signal 232, and may be converted to a digital form by an analog to digital converter, e.g., ADC 244. The digital signal is provided to the digital processing subsystem 250 for digital processing. The digital processing subsystem 250 processes the digital signal to receive the information-carrying content of the optical signal 210. The basic operation of the digital processing subsystem 250 is known in the art, and may include, e.g., a correlator 252 and a code generator 254, but the details of any particular implementation may vary.

In various examples, a receiver in accord with aspects and examples disclosed herein may include additional or fewer optics than discussed above, and may omit or add various components relative to those discussed above. For example, focusing optics may be included to receive the emerging optical signal 232 from the optical resonator 230 and to focus the optical signal 232 on the OEC 242. Certain examples may use analog receiver circuitry and therefore may omit one or more of the ADCs 224. Various examples may include a channel estimator as part of the digital processing subsystem 250 to provide phase rotation or other signal adjustments as may be known in the art.

Figure 3:
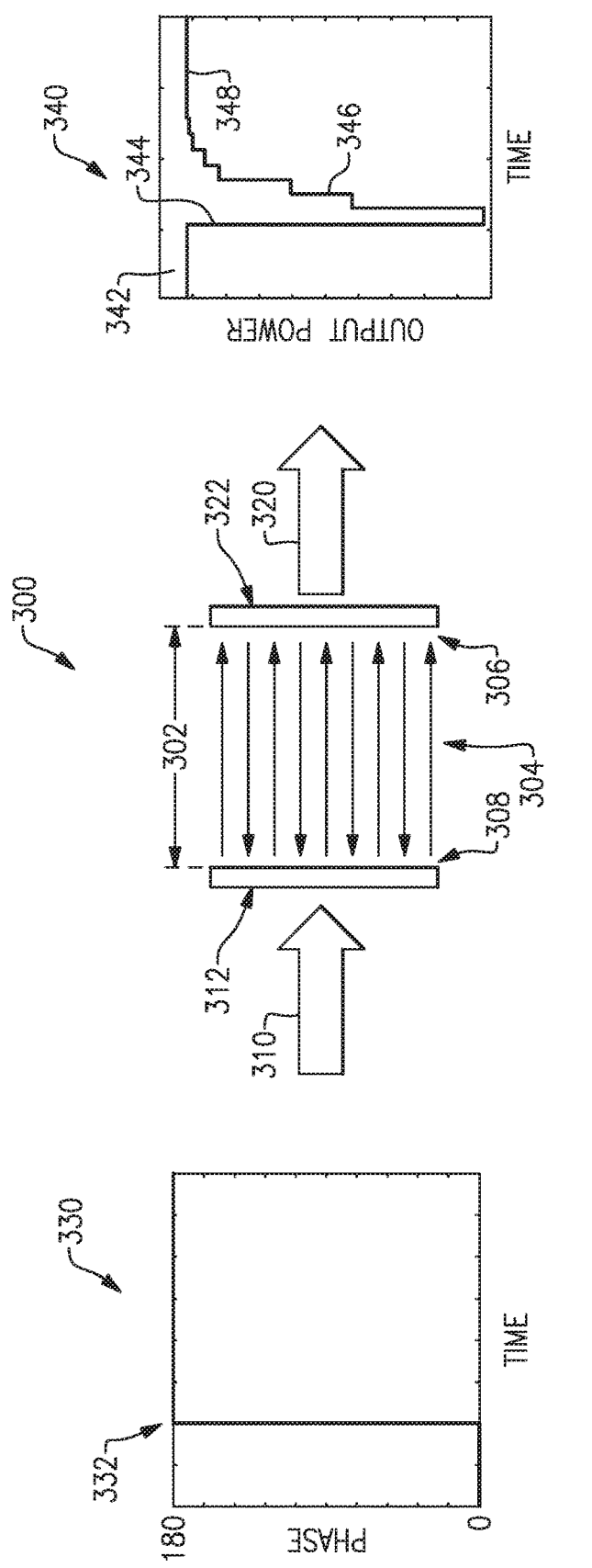
FIG. 3 is a schematic diagram of an example of an optical resonator, including a graph of received signal phase and a graph of output intensity of the optical resonator.

As discussed above, suitable optical resonators include etalons, and at least one example of an etalon is discussed with respect to FIG. 3, which illustrates an example of an etalon 300 which may be used in various examples of a receiver in accord with aspects and embodiments described herein, for example, as the optical resonator 230 in FIG. 2. In particular, a receiver may use the etalon 300 to convert phase modulations of a received optical communication signal 310 into intensity or amplitude modulations of an output optical signal 320. The intensity or amplitude modulated output optical signal 320 may then be converted to an electrical signal, with corresponding amplitude variations representative of the phase modulation of the received optical signal 310. The etalon 300 causes the received optical signal 310 to resonantly interact with itself, internal to the etalon 300, such that phase changes in the received optical signal 310 disrupt the resonance and cause amplitude (or intensity) variations at the output optical signal 320, which may be coupled directly to a detector.

In particular examples, the etalon 300 is designed to have a resonant frequency aligned with the source, e.g., a transmit laser, of the received optical communication signal 310. In various examples, a dimensional scale, e.g., length 302, of the etalon 300 is selected such that the etalon 300 exhibits optical resonance at the wavelength of the received optical communication signal 310. In certain examples, such dimensional scales are much shorter than the length of a transmitted symbol, which is the distance traveled by the optical signal between transitions that convey information, e.g., between phase changes in a phase modulated signal.

The etalon 300 includes an interior 304 with semi-reflective surfaces 306, 308 that reflect optical signal energy into the interior 304. An input side 312 allows optical signal energy, such as the optical communication signal 310, into the interior 304. The input side 312 thereby forms an aperture through which the arriving optical communication signal 310 is received. An output side 322 forms an optical output, at least in part by action of the semi-reflective surface 306 to allow a portion of trapped optical signal energy from the interior 304 to emerge as an output optical signal, such as the output optical signal 320. Accordingly, the semi-reflective surface 306 is also semi-transmissive, such that optical signal energy arriving (from the interior 304) at the semi-reflective surface 306 is partially reflected back to the interior 304 and partially transmitted through to the output side 322. The etalon 300 may have varying levels of reflectivity of the semi-reflective surfaces 306, 308. In certain examples, the reflectivity may be expressed as a fraction of light amplitude reflected back into the interior 304, or may be expressed as a fraction of light intensity reflected back into the interior 304. In a particular example, an amplitude reflectivity of the first semi-reflective surface 308 may be $r_1=0.999$ and an amplitude reflectivity of the second semi-reflective surface 306 may be $r_2=0.985$. In other examples the reflectivity of each of the first and second semi-reflective surfaces may be different, and may be any suitable value for a particular implementation. The etalon 300 is one example of a suitable optical resonator in accord with aspects and embodiments described herein.

According to certain examples, an optical resonator, such as the etalon 300, will coherently develop an output signal based on the input signal, and maintain a given level of the output signal until a modulation in the phase of the input signal occurs. When a phase modulation occurs in the input signal, destructive interference causes a phase-dependent change in the amplitude of the output signal. This can be seen in the input phase plot 330 and the output power plot 340 illustrated in FIG. 3. Accordingly, a received phase encoded optical communication signal, such as received optical signal 310, is converted to an amplitude varying signal, such as the output optical signal 320, by the optical resonator, such as the etalon 300. The output optical signal 320 is suitable for direct detection by a sensor, such as the OEC 242 of FIG. 2. Additionally, an optical resonator will function over a broad range of data rates without the need to modify the optical characteristics of the system, such as detector setup, path length adjustments, delay elements, or the like. For example, the ability of the etalon 300 to convert an arriving phase modulated input optical signal 310 into an intensity modulated output optical signal 320 may be independent of the modulation rate at which the input phase is changing, in some examples.

The use of the term "etalon" throughout this disclosure is not intended to be limiting and as used herein may include any of multiple structures, including plates with reflecting surfaces as well as parallel mirrors with various materials in between, and may also be referred to as cavities, interferometers, and the like. Additionally, etalon structures may be formed as a laminate, layer, film, coating, or the like.

FIG. 3 further illustrates operation of the etalon 300 with reference to the output power plot 340 of optical signal intensity (as output power) emerging from an optical resonator, such as the etalon 300, during a phase transition 332 in the received optical signal 310. At point 342 the etalon 300 is in a steady-state resonance condition wherein a steady intensity of light emerges. At point 344 a phase transition 332 occurs in the arriving optical signal 310, temporarily disrupting the steady-state and causing a change in the emerging light intensity. During successive reflections inside the etalon, labeled at point 346, resonance is being re-established and the emerging light intensity increases until, at point 348, a steady intensity of light emerges when the etalon 300 has returned to a steady-state condition.

Accordingly, variation in emerging light intensity from an optical resonator, such as the etalon 300, indicates that a transition occurred in an arriving optical signal, such as a phase, frequency, or amplitude variation, and such may be used by appropriate signal processing to determine useful information by analyzing the emerging light intensity. In the example discussed above and illustrated by FIG. 3, the arriving optical signal 310 is presumed to be phase modulated, but other examples include frequency or amplitude modulation, or any combination of these, and may cause similar variations or other detectable variations in output intensity. In some examples, higher order or more complex modulation may be accommodated by various optical resonator designs.

As a particular example, an etalon tuned to the arriving wavelength reacts to a phase variation in the arriving optical signal in accord with the discussion above and as illustrated in FIG. 3. If the arriving optical signal is modulated with binary phase shift keying (BPSK), for example, the output illustrated in FIG. 3 indicates each phase shift, and accordingly the information carried in the phase shift keying may be recovered from the intensity variations at the output optical signal 320. It should be understood by those of skill in the art with the benefit of this disclosure, that such information recovery is achieved without the necessity for a local coherent clock source or the need to support single-mode coupling, such as to a single mode fiber and delay-line interferometer, to demodulate the arriving optical signal.

In some examples, an etalon may include reflective surfaces (including semi-reflective surfaces) that are not co-planar and/or are not co-linear. For example, an interior reflective surface of an etalon may include some curvature, and an opposing surface may also be curved such that a distance between the two surfaces is substantially constant across various regions of the etalon, in some examples. In other examples, an etalon may have non-linear or non-planar surfaces with varying distances between the surfaces at various regions, and may still function as an optical resonator for various wavelengths and at various regions, suitable for use in examples discussed herein. Accordingly, an etalon may be purposefully designed to conform to a surface, or to have various regions responsive to differing wavelengths, or responsive to differing angles of arrival for a given wavelength, in certain examples.

Figure 4:
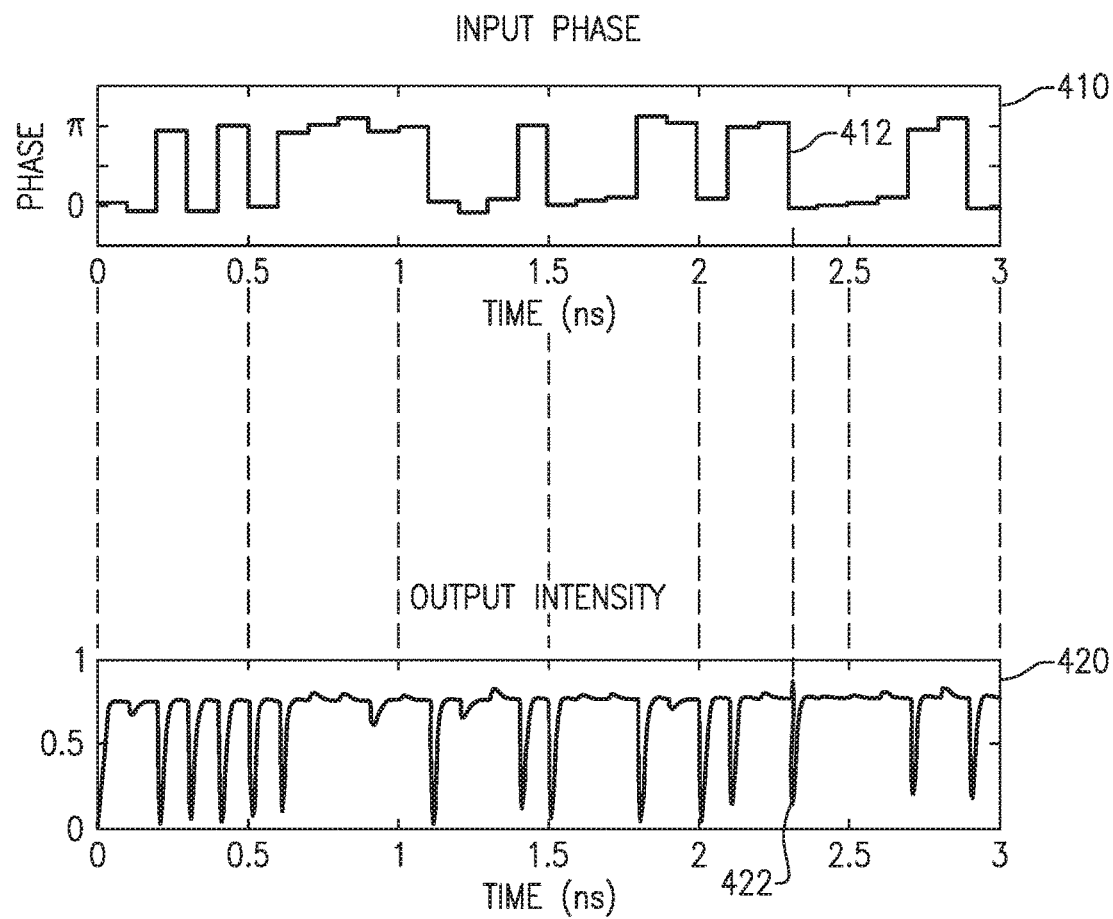
FIG. 4 is a graph of optical input phase and output intensity from an example of the optical resonator of FIG. 3.

FIG. 4 illustrates a plot 410 of varying phase of a received phase modulated optical signal, and a plot 420 of the resulting intensity of an output optical signal, from an optical resonator such as the etalon 300. The results shown in FIG. 4 are for an etalon having a length of 18μm and with reflectance of 0.999 at the semi-reflective surface 308 and reflectance of 0.985 at the semi-reflective surface 306. The otherwise continuous input phase (shown in the plot 410) changes at intervals according to the modulated information content, and the plot 410 can be seen as a sequence of binary data, such as high and low bits corresponding to ones and zeros, for example. Among the multiple phase transitions shown in the plot 410, a phase transition 412 is specifically associated with a change 422 in output intensity, shown in the plot 420. Each phase variation in the received optical signal causes a respective change in the output intensity. Accordingly, a receiver can track the changes in output intensity and thereby recover the information content of the received phase modulated optical signal.

Optical resonators, such as etalons, used to demodulate or convert optical signal modulations into intensity modulated output signals, as discussed herein, may be manufactured with significant aperture area to receive light signals, and may receive and operate on received light across a large aperture, such that portions of the light in one region of the aperture area may have varying phase relationship to other portions of the light received at other regions of the aperture area. The portions of light received at various regions may be operated on by the etalon essentially independently of each other. Light received at a first region of the etalon's aperture may be converted to intensity variations at an associated first output region, and light received at a second region of the aperture may be independently converted to intensity variations at an associated second output region, without interaction of the relative phases of the light arriving at each region. Accordingly, wavefront correction may not be required for detection and demodulation. Phase or other variations in any number of differing regions of the etalon's aperture may be simultaneously detected and converted into output intensity modulations at each of a respective output region. Such may be beneficial when the optical signal arriving at a receiver has propagated through a medium that causes wavefront variation, as described in more detail with respect to FIGS. 5A and 5B.

FIG. 5A illustrates the propagation of coherent light under ideal conditions, without experiencing aberrations due to an atmospheric condition, imperfection, or contamination in the medium through which the light travels, for example. Shown is a light source 510, such as a laser, for example, that generates a coherent light signal 512. For the purposes of the disclosure herein, coherency may be understood as phase alignment of a bundle of light rays. At a particular plane in space and time, if all the light rays have the same phase then the light is coherent. If the light signal 512 does not experience any aberrations, such as imperfections, contaminants, or perturbations in the propagation medium, the light signal 512 will have wavefronts 514 that remain phase aligned, i.e., coherent, as the light signal 512 propagates, e.g., from left to right in FIG. 5A.

FIG. 5B illustrates the propagation of coherent light through a more realistic medium, such as air, for example, where the light may encounter aberrations such as, notably, air perturbations. In FIG. 5B the light rays are influenced by air perturbations, or other obstructive influences, that may affect a portion of the light signal 512 differently than adjacent portions of the light signal 512 and, accordingly, the wavefronts 514 of the light signal 512 may become misaligned as illustrated in FIG. 5B. If information being carried by the light signal 512 is contained in the phase of the light signal 512, a conventional optical receiver, without wavefront correction, that focuses and concentrates the rays of the light signal 512, e.g., an optic lens system, will result in a focused spot that is many times the diffraction-limited size, with regions of intensity variation that make coupling to a single mode fiber inefficient and unstable. Such a conventional optical receiver requires some form of wavefront correction to restore the phase relationship across the wavefronts 514 to improve the intensity stability and allow a reduced spot size. By contrast, with an etalon 520, each region of the face (e.g., aperture) of the etalon 520 receives a portion of the light signal 512 that may be coherent within that portion, and at least does not substantially affect portions of the light signal 512 arriving at other regions of the face of the etalon 520. Accordingly, variations in arrival times of the wavefronts at the various regions of the etalon 520 may not require correction or compensation. The output intensity at various regions of the output side of the etalon 520 may occur at different moments, differing in time on the order of magnitude of the wavelength, or frequency, of the light, but the overall output intensity across the back face of the etalon 520 will vary in intensity at a rate on the order of the modulation rate. Accordingly, the amplitude variations between various regions are relatively minor (e.g., in time) relative to the timing of the phase-encoded transitions (e.g., the duration of a symbol).

It is to be understood that labeling of wavefronts, e.g., wavefronts 514, in FIGS. 5A and 5B, is arbitrary. Any position in space and/or time of a light signal may be identified as a wavefront for the purpose of discussing phase alignment with respect to other space-time positions. Further, the phase relationship, or coherency, of a bundle of light rays at one position in space-time may change as the bundle of light rays propagates and is influenced by the medium through which it travels. Further, alterations in phase relationship experienced by a particular bundle of light rays may not be the same as that experienced by another bundle of light rays that come before or after. Accordingly, the alignment or mis-alignment of arriving wavefronts may change significantly from one moment to the next, as illustrated by the varying alignment shown for each wavefront 514 in FIG. 5B.

Optical signals modulated to carry information have one or more characteristics that may change in either a continuous or discrete fashion, or some combination of the two, and segments of the light over time may be associated with the particular characteristic(s) that indicates the information being conveyed. For example, a phase modulated digital optical transmitter may emit coherent light of a certain phase relationship (relative to a reference time and/or phase) to indicate a particular value. The light emitted to indicate the value may be considered a segment of light, or a length of light, whose phase indicates the value. At later times the transmitter alters the light characteristic to emit a second segment of light to indicate a second value, then again later to emit a third segment of light, then a fourth, and so on. The rate at which the transmitter discretely alters the characteristic, as in this example, is a modulation rate of the transmitter, also known as a symbol rate or baud rate Each segment of light has a physical length associated with it based upon the duration of time between transitions and the speed of light in the propagation medium. For example, a modulation rate of $10^8$ baud (100 million symbols per second) emits light segments of 10 nanosecond duration with length of approximately 3 meters (in air or vacuum). Higher modulation rates generate shorter light segments and lower modulation rates generate longer light segments. A particular phase relationship of a single light segment may represent more than a single binary digit (bit) of information, e.g., because the phase (and/or amplitude), for example, may be selected from among multiple phases (and/or amplitudes), such that the information-carrying characteristic is not a binary selection. Accordingly, baud rate, symbol rate, or modulation rate is not necessarily equal to a transmission bit rate for a transmission system. Instead, the bit rate is generally the modulation rate times the number of bits per symbol (e.g., bits per light segment).

Some optical transmission systems may alter different or additional light characteristics, such as amplitude, frequency, wavelength, for instance, and may vary the modulation rate over time, e.g., based on channel characteristics, noise, error rate, and the like. Additionally, some optical systems may cause light to be modulated in an analog fashion, such as by a continuous variation in amplitude or phase of the light signal, and therefore not have a modulation rate per se. For the purposes of this disclosure, aspects and embodiments are generally described in the context of a discrete transmission system including a phase modulation, though it is to be understood that aspects and embodiments disclosed herein may be equally useful as receivers for systems that generate light signals that convey information differently than that described.

As discussed above, certain embodiments of an optical receiver system in accord with aspects disclosed herein may compensate, or accommodate, variation in wavefront arrival on a scale of a number of wavelengths. Light segments that convey a particular symbol are much longer than the wavelength of the light. Aspects and embodiments as disclosed herein operate such that the phase-varying information is converted to intensity-varying information without the need to focus to a single-mode fiber, thus eliminating the need for wavefront correction that would otherwise be necessary to achieve stable and efficient coupling.

For example, with continued reference to FIG. 5B, a wavefront 514 may have lost coherency during propagation such that portions of the wavefront may have phase differences on the order of multiple wavelengths relative to other portions of the wavefront. Accordingly, a conventional optical signal receiver using optics to focus the light signal 512 may apply wavefront correction to shift portions of the light signal by a fraction of a wavelength or multiple wavelengths, requiring accuracy of a fraction of a wavelength, which may be complex and costly. In certain embodiments of an etalon-based optical receiver as disclosed herein, each region of the etalon 520 may receive only a portion of the light signal 512 and the portion received may be sufficiently coherent, e.g., not having significant phase variation across the portion, that the etalon 520 region may accurately detect the phase content of the portion of the light signal 512 and convey it as intensity variations at the output, which may be combined or focused with intensity-varying light from other regions of the output to detect an overall output intensity, without the need for wavefront correction in the optical domain.

Accordingly, aspects and examples described herein provide systems and methods for demodulation of phase encoded optical signals without conventional wavefront correction. In some examples, etalon optical resonators provide phase to intensity conversion of received optical signals, including from free space, such that accommodation of wavefront variations is significantly simplified. As described above, direct wavefront correction requires spatial corrections on the order of fractions of a wavelength (e.g., microns, µm), conventionally achieved with adaptive optics, whereas aspects and embodiments disclosed herein may eliminate the need for such systems.

Aspects and embodiments disclosed herein can tolerate wavefront distortion on the order of dozens of wavelengths or more. Further, aspects and embodiments disclosed herein may operate on free space optical signals, eliminating the need to couple light into a single mode fiber. Additionally, an etalon may be tuned to the wavelength of an optical signal, independent of modulation or communication rates, and therefore function over a broad range of information rates without the need to modify the characteristics of the receiver.

Figure 6:
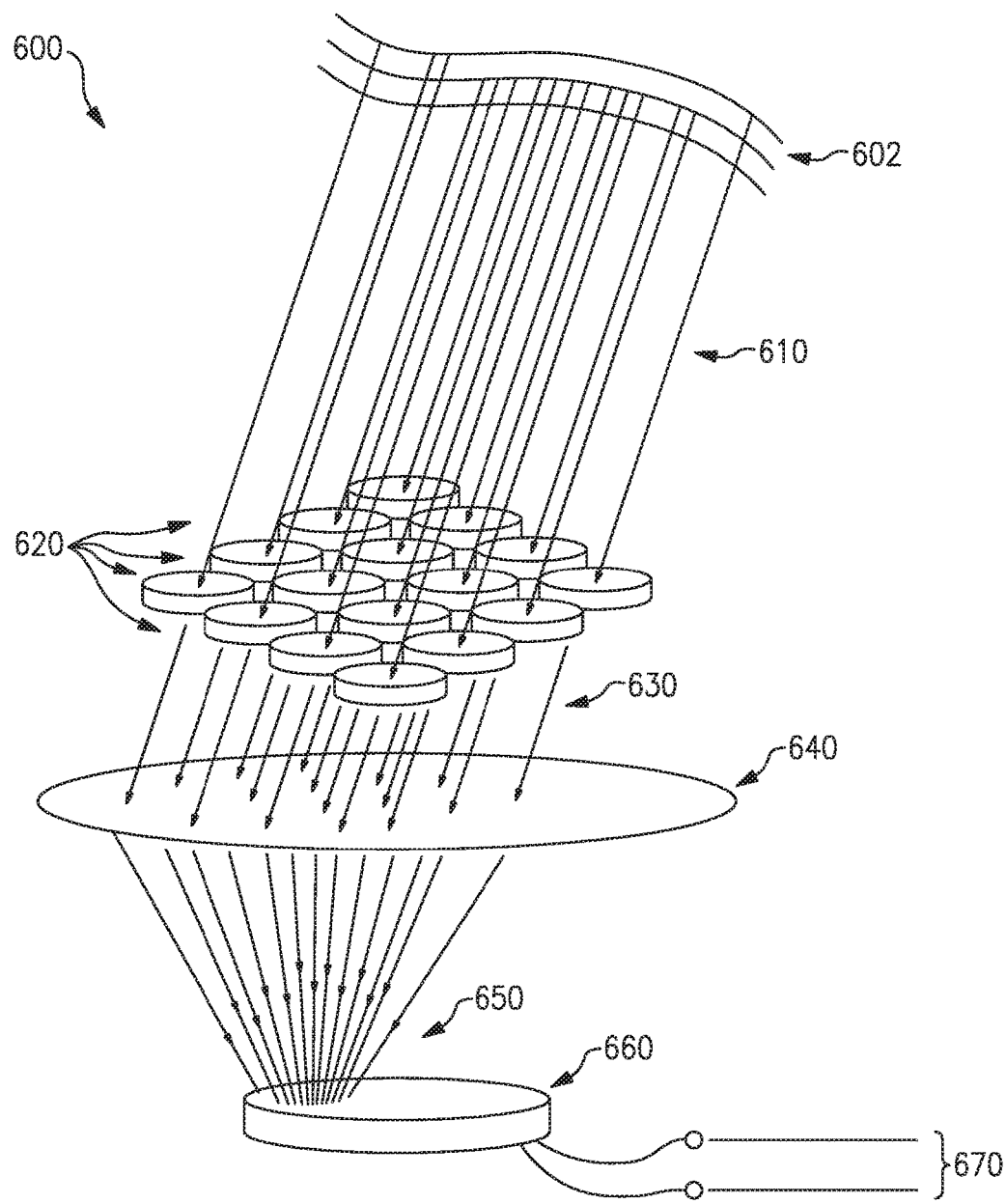
FIG. 6 is a schematic diagram of an example of an optical signal receiver portion utilizing an optical resonator.

FIG. 6 illustrates an example of an optical portion 600 of a free-space optical receiver that accommodates aberrations 602 in an arriving phase encoded optical signal 610. The optical portion 600 includes a number of etalons 620, each of which operates on a portion of the phase encoded optical signal 610 that arrives at a face, or aperture, of each respective etalon 620. Across the aperture of each etalon 620, localized wavefront distortions associated with the aberrations 602 are limited, due to the relative area of the aperture and lack of interaction between optical signal portions arriving at one region of the aperture versus another region of the aperture. Each of the etalons 620 converts a portion of the arriving phase encoded optical signal 610 into a portion of an output intensity encoded optical signal 630, as described above regarding the operation of an etalon (or other optical resonator), such as the etalon 300 of FIG. 3.

Accordingly, the information conveyed in the phase relationships of segments of the arriving optical signal 610 is retained in the output optical signal 630, yet has been converted into intensity variations, detectable and measurable without regard to phase relationships among the portions of the output optical signal 630. The effect of wavefront distortions in the arriving optical signal 610 are limited, or irrelevant, due in part to a lack of interaction between optical signal portions arriving at one etalon 620 versus other etalons 620, and arriving at one region of a single etalon versus other regions of the single etalon.

Accordingly, the output optical signal 630 may be detected and/or converted into electrical signals for processing by an e.g., processing subsystem 250 (see FIG. 2). For example, and optionally, the output optical signal 630 may be focused, e.g., by a lens or lens system 640, or processed by other optical elements, such as to form a focused optical signal 650. Such a focused optical signal 650 may be soft focused, or otherwise not required to have a near diffraction-limited focus such as would be required for coupling to a single-mode fiber. Instead, a soft focus may be sufficient, e.g., for a photodetector 660 to receive the optical signal 650 and optionally convert it to an electrical signal at an output 670. In some examples, the output intensity encoded optical signal 630 may not require any focus, and/or may be provided directly to, e.g., a photodetector 660.

According to some examples, the etalons 620 of FIG. 6 need not be arranged in a linear and/or planar fashion, as shown. For example, a number of etalons similar to the etalons 620 may be arranged to conform to a certain shape, such as a surface of a vehicle or other non-planar structural support, and the intensity of the output optical signal 630 may nonetheless represent phase information of the arriving optical signal 610. While phase transitions of the arriving optical signal may not arrive at each of the etalons at the same moment in time (e.g., due to variation in placement of the etalons, angle of arrival of the optical signal, as well as wavefront variation by aberration or other sources), examples in accord with those disclosed herein alleviate the need for such precision of arrival of the wavefront. Each of the etalons, or each region of an etalon (or other resonator), may be capable of converting phase modulation of the optical signal portion arriving at the region, into intensity modulation, without regard for how precisely aligned the local phase transition is with regard to arrival at other regions and/or other resonators.

Figure 7:
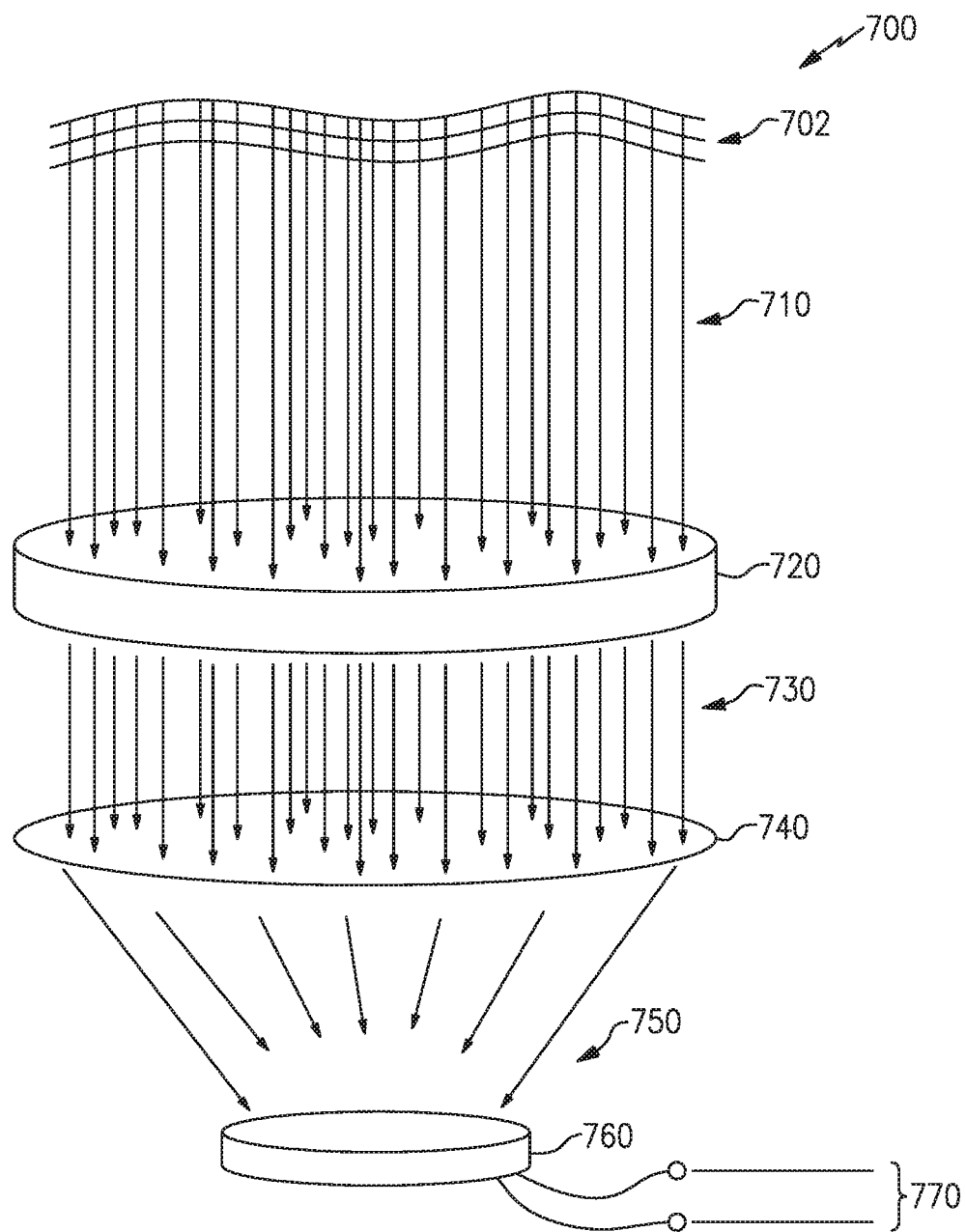
FIG. 7 is a schematic diagram of another example of an optical signal receiver portion utilizing an optical resonator.

FIG. 7 illustrates another example of an optical portion 700 of a free-space optical receiver that accommodates aberrations 702 in an arriving phase encoded optical signal 710. The optical portion 700 includes an etalon 720, multiple regions of which operates on a portion of the phase encoded optical signal 710 that arrives at a respective region of its face, or aperture. Across the aperture of the etalon 720, wavefront distortions associated with the aberrations 702 are localized, due to the relative area of the aperture, and lack of interaction between optical signal portions arriving at one region of the aperture versus another region of the aperture allows the etalon 720 to locally convert phase variations in the arriving optical signal 710 into intensity variations of an output optical signal 730. Each region of the etalon 720 converts a portion of the arriving phase encoded optical signal 710 into a portion of the output intensity encoded optical signal 730, as described above regarding the operation of an etalon (or other optical resonator), such as the etalon 300 of FIG. 3.

Accordingly the output optical signal 730 of FIG. 7 may be directly detected and/or converted into electrical signals for further processing, in like manner to that discussed above with respect to FIG. 6. For example, a lens 740 or other optics may process the optical signal 730 to, e.g., provide a focused optical signal 750, which may be soft focused, and the focused optical signal 750 (or the optical signal 730) may be provided to a photodetector 760 for conversion into an electrical signal at an output 770. Other embodiments may process the intensity encoded output optical signal 730 in different ways.

Similar to that discussed above with respect to FIGS. 3 and 6, the etalon 720 of FIG. 7 need not be planar, as shown, but may have a different physical shape, in some examples, which may be designed to match a support structure or other surface, such as a vehicle exterior, in further examples. The shape and thickness of an etalon may vary at differing regions to accommodate varying requirements and/or operational characteristics. Differing regions may be designed with differing resonant wavelengths and/or to provide resonance for a given wavelength at differing angles of arrival, for example, and therefore be made to operate for a given scenario or operational environment, within constraints of the physical structure(s) available to position and/or mount various optical components, including an optical resonator.

With reference to FIGS. 6 and 7, some embodiments may include a single optical resonator, such as the etalon 720, and other embodiments may include a number of optical resonators, such as the etalons 620. In some embodiments, an aperture having various regions to receive portions of an arriving phase encoded optical signal may be provided by different forms of optical resonator(s) that may operate on the various portions of arriving optical signal substantially without interaction between optical signal portions arriving at one region of the aperture versus another region of the aperture. Any interaction of portions of an optical signal, e.g., at regions of an aperture such as an etalon aperture, may be insubstantial when such interactions are localized over a relatively small area. For example, phase variations due to aberration may be sufficiently negligible over small regions in which some portion of the optical signal may interact with another portion of the optical signal. For further example, an optical resonator may be designed, and/or materials and geometric structures selected, so that an amount of diffraction (e.g., by interaction of optical signals with the materials and geometry) is small enough to keep one region from substantially interacting with another region.

In various embodiments, one or more etalons, such as the etalons 620, 720, may vary widely in physical dimensions. For example, some embodiments may include etalons having an optical face (aperture for receiving an optical signal) with a physical size on the order of millimeters. Other embodiments may have apertures on the order of multiple inches, such as six inches or larger. In some embodiments, multiple etalons of smaller apertures may provide a similar effective aperture as a single larger etalon.

Additionally, various embodiments may accommodate varying sizes of photodetector, such as the photodetectors 650, 750. In some embodiments, a photodetector may have a light sensing face with an effective diameter on the order of 100 microns or more, allowing for a an optical signal to be focused to a similar scale. Such is in contrast to systems that couple an optical signal to a single mode fiber, which may be on the order of 9 microns, requiring near diffraction-limited focusing, active optics for wavefront correction, and precise coupling optics, at greater expense.

Advantages of the aspects and embodiments described herein are numerous. For example, optical components may be lower cost or less complex than those required for conventional systems, such as allowing for coated or uncoated glass rather than crystal or expensive coatings. Use of optical resonators, such as etalons, for converting phase modulation into intensity modulation, may be advantageously designed to incorporate filtering (e.g., rejection of unwanted signals, via resonant dimensions, for example) which may provide improved signal-to-noise characteristics. Aspects and embodiments in accord with those described herein may satisfactorily operate in extreme aberration or turbulence in which adaptive optics would fail. Further, aspects and embodiments in accord with those described herein may achieve free-space optical communications with low size, weight, power, and cost requirements, improving support for platforms such as unmanned aerial vehicles and microsatellites.

It should be appreciated that the various disruptions to output intensity caused by modulation of an arriving light signal may vary with resonant physical dimensions of an optical resonator, such as the dimensional length of an etalon, and how accurately it is manufactured, e.g., how well tuned the etalon is to one or more wavelengths. Output intensity from an etalon with a smaller dimensional length is more quickly disrupted by a transition in the input signal, and more quickly re-establishes steady state after such a transition, relative to an etalon with a larger resonant dimension. Additionally, an etalon manufactured to a more accurate tolerance, i.e., more accurately tuned to the particular wavelength (or set of wavelengths), provides a higher resonant output signal intensity at steady state and exhibits greater sensitivity to transitions in input signals, relative to an etalon manufactured to a less accurate tolerance.

Various embodiments may have various etalon dimensions and tolerances based upon particular design criteria and to accommodate varying operational characteristics. In some examples, various etalon dimensions and tolerances may be selected to trade off, or balance, how strongly and/or how quickly the etalon responds to transitions in an arriving optical signal, such as phase transitions associated with phase modulation, and how quickly the etalon approaches a return to steady-state after a transition. Additionally, various etalon dimensions and tolerances may be selected to optimize a receiver, such as the receiver 200, for a particular data rate and/or a particular wavelength.

Various dimensions of an optical resonator in accord with aspects and examples disclosed herein may be significantly smaller than a dimension associated with a baud rate or symbol length of a phase encoded optical signal. In some examples, a resonant dimension (e.g., etalon length, cavity round-trip length, etc.) may provide an effective optical length less than half the distance associated with a baud rate or symbol length. For example, a baud rate may be a rate at which modulation variations occur, and a symbol length may be the distance an optical signal travels between modulation variations.

In the case of an optical resonator, the distance the optical signal travels may be based upon the material, or optical media, from which the optical resonator is constructed. For an optical resonator (e.g., etalon) capable of storing optical signal energy and providing resonance through constructive and destructive interference, optical signal energy remains in the resonator for a greater amount of time, such that an effective optical length is greater than the resonator's physical length, i.e., optical signal energy spends more time in the resonator than if the resonator allowed the optical signal to pass through without resonantly accumulating. Accordingly, a time until the next modulation variation (i.e., inverse of the baud rate) may be enough time for an arriving optical signal to traverse the resonant dimension of the optical resonator numerous times. In certain examples, the resonant dimension (etalon length) may provide an effective optical length one third or less of the symbol length. In some examples, the physical dimension of the etalon length may be on the order of one tenth of the symbol length or less, (e.g., depending upon the reflectivity of the etalon surfaces, for example) to provide an effective optical length of one third of the symbol length. Accordingly, in some examples, a symbol length may be as short as 10 times the physical dimension of the etalon, or less. Additionally, the symbol length may be as long as 5,000 times the physical dimension of the etalon, or more, in accord with aspects and examples being capable of accommodating a wide variety of modulation rates, as previously discussed.

Additional benefits associated with the use of an optical resonator, such as an etalon, as a front end component combined with a processing subsystem, for the reception of modulated optical signals, include flexible operation, capable of receiving signals from free space or via a fiber coupling or other optical waveguides and/or components. An optical resonator may also provide noise reduction due to rejection of optical signal energy outside the intended wavelengths, e.g., due to the resonate nature. Additionally, an optical resonator may be provided with coatings or other features to further reject undesired optical wavelengths, including alternate resonant wavelengths that are not intended to be part of the received signal. For example, a particular length (or width, depending upon perspective) of an optical component may resonate at multiple wavelengths but coatings and/or other design features may act to limit the build-up of optical signal energy at the undesired wavelengths, such as a coating that provides reduced reflectivity at alternate wavelengths, or filters integrated with or placed before the aperture of the optical resonator, or others.

Additional modulation formats may also be accommodated by particular design characteristics of an optical resonator. The resonant nature may respond to pulse width or other modulations in addition to purely phase transitions.

For example, a pulse width modulated signal causes the signal energy trapped in the resonator to build up or approach a steady-state value, and the longer the pulse width the closer the resonator will come to, or the longer it will remain in, a steady-state signal energy condition. When the pulse ceases, the optical resonator's output will change similar in manner to a phase transition. Accordingly, amplitude and pulse width modulations of an arriving optical signal may be detected by processing the optical intensity output of the optical resonator.

Certain embodiments may incorporate various additional aspects or components to further provide selectivity of one light signal over another. For example, light of certain wavelengths may be preferred or rejected through the use of frequency selective filters, frequency selective coatings, and/or by selection of frequency selective dimensions or other features of an optical resonator or other resonant structures.

As discussed above with reference to FIGS. 1 and 2, in various examples components of the transmitter 100 and/or receiver 200 may be implemented as one of, or a combination of, analog circuitry, digital circuitry, or one or more digital signal processors (DSP) or other microprocessors executing software instructions. Software instructions may include DSP instructions. Various aspects and functions described herein may be implemented as specialized hardware or software components executing in one or more computer systems.

Figure 8:
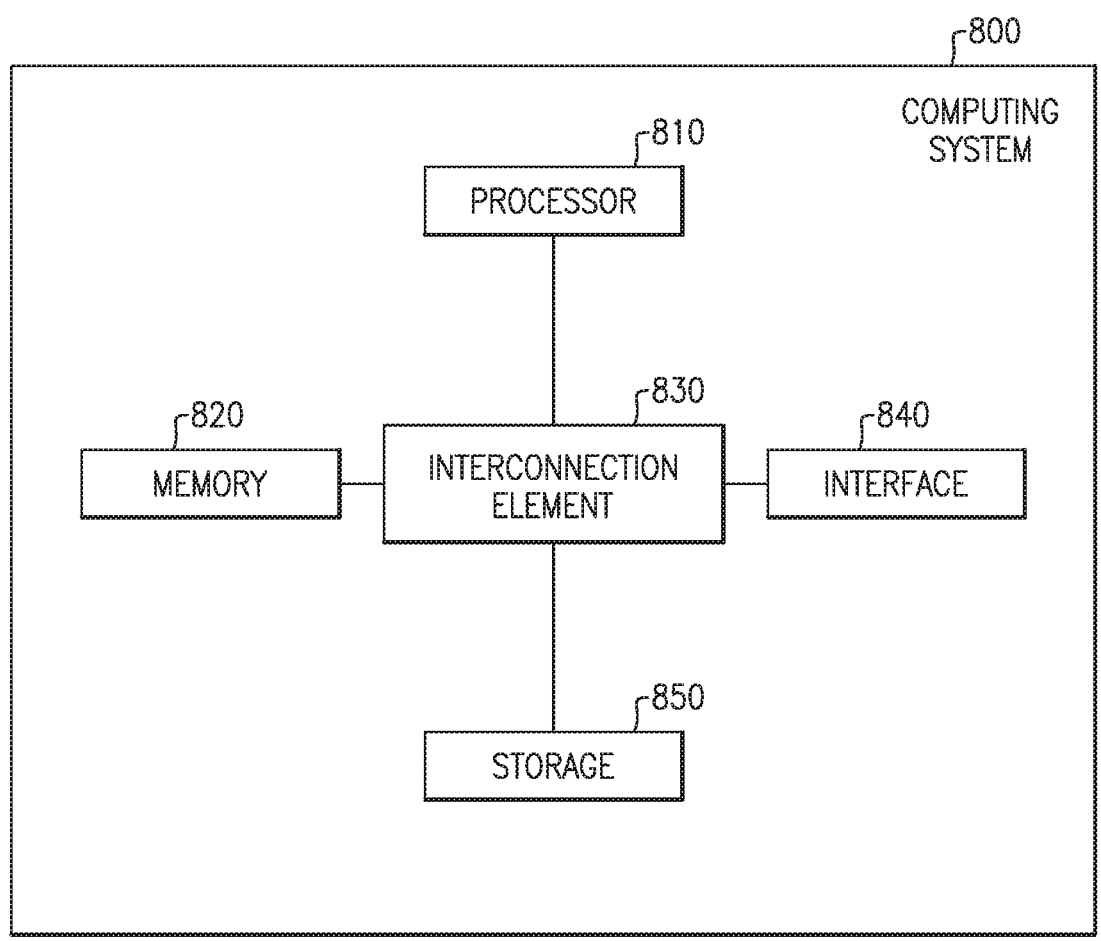
FIG. 8 is a functional block diagram of an example of a computing system that may be configured to implement various examples of the processes described herein.

FIG. 8 illustrates one example of a computing system 800 that may implement software routines corresponding to a control circuit or module, the FEC module 104, the spreading module 106, the mapping module 108, as illustrated in FIG. 1, and/or other components. The computing system 800 may further implement software routines corresponding to the correlator 252 and/or the code generator 254 associated with the digital processing subsystem 250 of FIG. 2 and/or other components of a receiver 200. The computing system 800 may include a processor 810, data storage 850, a memory 820, and one or more interfaces 840, such as a system interface and/or a user interface. While not explicitly illustrated in FIG. 8, in certain examples the computing system 800 may be coupled to a power source. The power source may deliver power to one or more components of the computing system 800, as well as other components of the optical transmitter 100 or optical receiver 200.

In FIG. 8, the processor 810 is coupled to the data storage 850, memory 820, and the various interfaces 840. The memory 820 stores programs (e.g., sequences of instructions coded to be executable by the processor 810) and data during operation of the computing system 800. Thus, the memory 820 may be a relatively high performance, volatile, random access memory such as a dynamic random access memory ("DRAM") or static memory ("SRAM"). However, the memory 820 may include any device for storing data, such as a disk drive or other nonvolatile storage device. Various examples may organize the memory 820 into particularized and, in some cases, unique structures to perform the functions disclosed herein. These data structures may be sized and organized to store values for particular data and types of data.

The data storage 850 includes a computer readable and writeable data storage medium configured to store non-transitory instructions and other data, and can include non-volatile storage media, such as optical or magnetic disk, ROM or flash memory. The instructions may include executable programs or other code that can be executed by the at least one processor 810 to perform any of the functions described herein.

In various examples, the computing system 800 includes several interface components 840, such as a system interface and/or a user interface. Each of the interface components 840 is configured to exchange, e.g., send or receive, data with other components of the computing system 800 (and/or associated transmitter or receiver), or other devices in communication with the computing system 800. According to various examples, the interface components 840 may include hardware components, software components, or a combination of hardware and software components.

In certain examples, components of the system interface couples the processor 810 to one or more other components of the optical transmitter 100 shown in FIG. 1, or of the optical receiver 200 shown in FIG. 2. The system interface may provide one or more control signals to any such components and may manage the operation of such components, as described above.

A user interface may include hardware and/or software components that allow a corresponding transmitter or receiver in which the computing system 800 is incorporated to communicate with an external entity, such as a user. These components may be configured to receive information from user interactions with the user interface. Examples of the components that may be employed within the user interface include buttons, switches, light-emitting diodes, touch screens, displays, stored audio signals, voice recognition, or an application on a computer-enabled enabled device in communication with the computing system 800. Data received at the various interfaces may be provided to the processor 810, as illustrated in FIG. 8. Communication coupling (e.g., shown interconnection mechanism 830) between the processor 810, memory 820, data storage 850, and interface(s) 840 may be implemented as one or more physical busses in conformance with standard, proprietary, or specialized computing bus technologies.

The processor 810 performs a series of instructions that result in manipulated data that is stored in and retrieved from the data storage 850, as discussed above. In various examples, the series of instructions result in interpretation of the outputs from optical resonators as discussed above. Such instructions may correspond to commands for interpreting peaks and troughs of such output signals to determine phase, frequency, or amplitude changes (modulations) in an arriving optical signal, and/or recovering a data payload therefrom, as discussed herein.

The processor 810 may be any type of processor, multi-processor or controller, whether commercially available or specially manufactured. For instance, the processor may include a commercially available processor, such as a processor manufactured by INTEL, AMD, MOTOROLA, or FREESCALE. In some examples, the processor 810 may be configured to execute an operating system, such as a real-time operating system (RTOS), for instance RTLinux, or a non-real time operating system, such as BSD or GNU/Linux. The operating system may provide platform services to application software. These platform services may include inter-process and network communication, file system management and standard database manipulation. One or more of many operating systems may be used, and examples are not limited to any particular operating system or operating system characteristic.

Portions of the disclosure herein make reference to orders of magnitude of distance, e.g., length, and time, e.g., duration, of aspects of light signals, with regard to the length or duration of a segment of light or a wavelength of light. It is to be understood that distance and duration may at times be used interchangeably with respect to light and optical systems, and unless the context implies otherwise, the relationship between distance and duration with respect to light is the speed of light in the medium of propagation. For example, phase relationships are on the order of one wavelength of light, and a wavelength is directly inversely proportional to frequency by the speed of light in the propagation medium. Similarly, segments of light generated by modulation of a light source are on the order of the segment length, which is directly inversely proportional to modulation rate by the speed of light in the propagation medium.

Having thus described several aspects of at least one embodiment, it is to be appreciated various alterations, modifications, and improvements will readily occur to those skilled in the art. Such alterations, modifications, and improvements are intended to be part of this disclosure and are intended to be within the scope of the disclosure. Accordingly, the foregoing description and drawings are by way of example only.

What is claimed is:

1. An optical signal receiver comprising:
    at least one optical resonator defining a plurality of regions, an aperture to allow optical signal energy to enter, and an output to allow a portion of optical signal energy to be emitted, the at least one optical resonator configured to receive an optical signal via the aperture, to accumulate resonant optical signal energy at least within each region, to cause the emitted optical signal energy associated with each region to approach a steady-state output value, and to disturb the emitted optical signal energy associated with each region upon a transition in the received optical signal, the at least one optical resonator having at least one dimension to cause phase alignment of the accumulated optical signal energy at one or more resonant wavelengths; and
    a detector aligned with the output and configured to detect the disturbance to the emitted optical signal energy from one or more of the regions, and to determine a characteristic of the transition in the received optical signal based upon the disturbance.

2. The optical signal receiver of claim 1 wherein the at least one optical resonator includes a plurality of optical resonators, each of the plurality of optical resonators defining at least one of the plurality of regions.

3. The optical signal receiver of claim 1 further comprising a focusing optic aligned with the output and configured to focus the emitted optical signal energy associated with each region to provide a focused optical signal to the detector.

4. The optical signal receiver of claim 1 wherein each region of the at least one optical resonator is configured to produce a temporary change in intensity of the emitted optical signal energy in response to a phase transition in the received optical signal, and the detector is further configured to detect a combined temporary change in the intensity of a combined emitted optical signal energy from all of the plurality of regions, and to determine the phase transition in the received optical signal based upon the combined temporary change.

5. The optical signal receiver of claim 4 wherein each region of the at least one optical resonator is configured to produce a variation in intensity of the emitted optical signal energy in response to amplitude variations in the received optical signal, and the detector is further configured to detect a combined variation in intensity from the combined emitted optical signal energy from all of the plurality of regions, and to determine the amplitude variation in the received optical signal based upon the combined variation in intensity.

6. The optical signal receiver of claim 1 wherein the at least one optical resonator includes first and second reflective surfaces with reflective sides facing each other, the first reflective surface forming at least a portion of the aperture and being partially transmissive to optical signal energy arriving from outside the at least one optical resonator to allow optical signal energy into the at least one optical resonator, the second reflective surface forming at least a portion of the output and being substantially reflective but partially transmissive to optical signal energy inside the at least one optical resonator to allow the portion of the optical signal energy inside the at least one optical resonator to be emitted outside the at least one optical resonator.

7. The optical signal receiver of claim 1 further comprising an optical-electrical converter configured to convert the emitted optical signal energy into an electrical signal, the electrical signal having an amplitude indicative of an intensity of the emitted optical signal energy, and the detector configured to detect the disturbance to the emitted optical signal energy by processing the electrical signal.

8. A method of detecting information encoded in an optical signal, the method comprising:
    receiving an optical signal at a plurality of regions of an aperture;
    accumulating optical signal energy from the optical signal in associated regions of at least one optical resonator, to approach a steady state of accumulated optical signal energy in the associated regions;
    outputting optical signal energy from the accumulated optical signal energy, the intensity of the output optical signal energy from each associated region proportional to the accumulated optical signal energy in each associated region;
    detecting combined output optical signal energy, the combined output optical signal energy being a combination of the output optical signal energy from a plurality of the associated regions; and
    determining a modulation characteristic of the received optical signal based on the detected combined output optical signal energy.

9. The method of claim 8 wherein determining a modulation characteristic of the received optical signal based on the detected combined output signal energy includes determining a phase variation in the received optical signal based on an intensity variation in the combined output optical signal energy.

10. The method of claim 8 further comprising reducing the accumulated optical signal energy in the associated regions of the optical resonator by destructive interference within the at least one optical resonator, in response to the modulation characteristic of the received optical signal.

11. The method of claim 10 wherein the modulation characteristic of the received optical signal is a phase transition associated with a phase modulation.

12. The method of claim 8 wherein accumulating the optical signal energy in associated regions of at least one optical resonator includes partially reflecting the optical signal energy between two semi-reflective surfaces.

13. The method of claim 8 further comprising converting the combined output optical signal energy into an electrical signal, the amplitude of the electrical signal being representative of the intensity of the combined output optical signal energy.

14. The method of claim 13 wherein converting the combined output optical signal energy into an electrical signal includes focusing the output optical signal energy from a plurality of the associated regions.

15. An optical receiver comprising:
- at least one etalon configured to at least partially accumulate optical signal energy at a plurality of regions between two semi-reflective surfaces and having an aperture to allow optical signal energy to enter and an output to allow a portion of the accumulated optical signal energy to be emitted from the plurality of regions, the at least one etalon configured to cause the output optical signal energy from each of the plurality of regions to temporarily vary in intensity based upon a phase transition in the entering optical signal energy at the respective region;
- an optical-electrical converter configured to receive the output optical signal energy from the plurality of regions and to convert the output optical signal energy into an electrical signal; and
- a receiver configured to receive the electrical signal and to determine information about the phase transition based in part on the electrical signal.

16. The optical receiver of claim 15 wherein the at least one etalon includes a plurality of etalons, each of the plurality of etalons defining at least one of the plurality of regions.

17. The optical receiver of claim 15 further comprising an analog to digital converter configured to convert the electrical signal from an analog form to a digital form, the receiver configured to receive the digital form of the electrical signal.

18. The optical receiver of claim 15 wherein the receiver is further configured to correlate the electrical signal with at least one of a spreading code, a pseudo-random code, a block code, and a convolution code.

19. The optical receiver of claim 15 wherein the at least one etalon is configured to have a nominal dimension selected to cause the etalon to at least partially accumulate optical signal energy of a particular wavelength.

20. The optical receiver of claim 15 wherein the at least one etalon is configured to have a nominal dimension selected to cause the accumulation of optical signal energy to occur at a particular rate to accommodate an expected data rate associated with the data.

* * * * *